(12) United States Patent
Esposito et al.

(10) Patent No.: US 7,598,790 B1
(45) Date of Patent: Oct. 6, 2009

(54) CLOCK SYNTHESIS USING POLYPHASE NUMERICALLY CONTROLLED OSCILLATOR

(75) Inventors: Benjamin Esposito, Oviedo, FL (US); Hong Shan Neoh, Princeton, NJ (US)

(73) Assignee: Altera Corporation, San Jose, CA (US)

( * ) Notice: Subject to any disclaimer, the term of this patent is extended or adjusted under 35 U.S.C. 154(b) by 65 days.

(21) Appl. No.: 12/022,934

(22) Filed: Jan. 30, 2008

(51) Int. Cl.
*G06F 1/04* (2006.01)
*H03K 3/00* (2006.01)

(52) U.S. Cl. .................. 327/294; 327/291; 331/45; 331/46

(58) Field of Classification Search ............... 331/45, 331/46; 327/105–107, 129, 291, 293, 294
See application file for complete search history.

(56) References Cited

U.S. PATENT DOCUMENTS

| | | | |
|---|---|---|---|
| 4,933,890 A | 6/1990 | Nuytkens et al. | |
| 6,650,721 B1 | 11/2003 | Janesch et al. | |
| 7,109,808 B1 | 9/2006 | Pelt | |
| 7,288,972 B1 | 10/2007 | Esposito et al. | |
| 7,406,134 B1 * | 7/2008 | Esposito | 375/308 |

OTHER PUBLICATIONS

In-Gi Lim and Whan-Woo Kim, "A Numerically Controlled Oscillator with a Fine Phase Tuner and a Rounding Processor," ETRI Journal, vol. 26, No. 6, Dec. 2004, pp. 657-660.

* cited by examiner

*Primary Examiner*—David Mis
(74) *Attorney, Agent, or Firm*—Steven J. Cahill (57) ABSTRACT

A clock synthesis circuit includes a polyphase numerically controlled oscillator, an extraction circuit, and a clock signal generation circuit. The polyphase numerically controlled oscillator generates sets of periodic output signals. Each set of the periodic output signals represents a different phase of a periodic waveform signal. The extraction circuit extracts a most significant bit from each set of the periodic output signals of the polyphase numerically controlled oscillator to generate most significant bits. The clock signal generation circuit converts the most significant bits into a serial bit stream that serves as an output clock signal.

20 Claims, 5 Drawing Sheets

CLOCK SYNTHESIS USING POLYPHASE NUMERICALLY CONTROLLED OSCILLATOR

BACKGROUND OF THE INVENTION

The present invention relates to electronic circuits, and more particularly, to clock synthesis using polyphase numerically controlled oscillators.

Typically, in a programmable logic device (PLD), several different clock signals are used during the operation of the PLD. Clock signals can be generated using, for example, phase-locked loops (PLLs) and numerically controlled oscillators (NCOs).

BRIEF SUMMARY OF THE INVENTION

Some embodiments of the present invention include a polyphase numerically controlled oscillator, an extraction circuit, and a clock signal generation circuit. The polyphase numerically controlled oscillator generates sets of periodic output signals. Each set of the periodic output signals represents a different phase of a periodic waveform signal. The extraction circuit extracts a most significant bit from each set of the periodic output signals of the polyphase numerically controlled oscillator to generate most significant bits. The clock signal generation circuit converts the most significant bits into an output clock signal.

Various objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
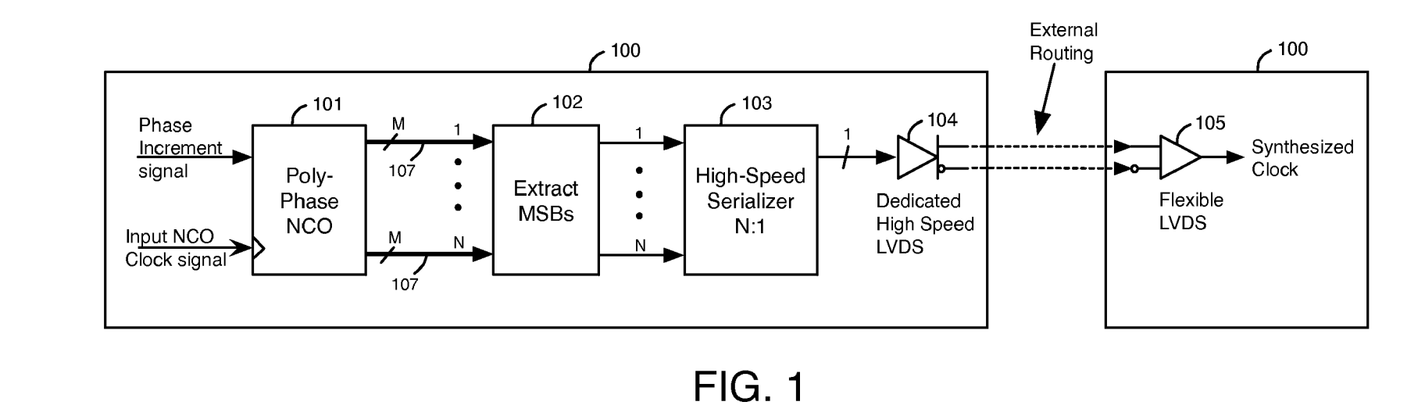
FIG. 1 illustrates a clock synthesis circuit, according to an embodiment of the present invention.

FIG. 1 illustrates a clock synthesis circuit, according to an embodiment of the present invention. The clock synthesis circuit of FIG. 1 includes polyphase numerically controlled oscillator (NCO) circuit 101, extract most significant bits (MSBs) circuit 102, and high-speed serializer circuit 103. The clock synthesis circuit is fabricated on an integrated circuit 100. The integrated circuit 100 can be, for example, a programmable logic device (PLD), a field programmable gate array (FPGA), or an application specific integrated circuit (ASIC).

Polyphase numerically controlled oscillator (NCO) 101 is also sometimes referred to as a polyphase digitally controlled oscillator (DCO). Polyphase NCO 101 receives a Phase Increment signal and an Input NCO Clock signal as input signals. Polyphase NCO 101 generates an N number of output phases in parallel in response to the Phase Increment and Input NCO Clock signals. The N output phases of NCO 101 represent N different phases of a periodic sinusoidal waveform (e.g., a sine wave or a cosine wave).

Each unique phase of the periodic sinusoidal waveform generated by NCO 101 is represented by M bits. The M signals are transmitted through N parallel buses 107 to Extract MSBs circuit 102. Polyphase NCO 101 generates M×N signals that are transmitted through N parallel buses 107, where each bus 107 has M signal lines. N and M can be any positive integers greater than 1, although M is typically above 8 bits to provide adequate spectral resolution.

Each of the N output phases generated by polyphase NCO 101 has a phase shift of 1/N relative to the two adjacent phases. For example, if N=8, NCO 101 generates 8 different phases. These phases are equally spaced apart (e.g., 0°, 45°, 90°, 135°, 180°, 225°, 270°, 315°) and provide the equivalent successive phases as if a single phase NCO was being clocked at N times the frequency of the Input NCO Clock signal. This technique allows NCO 101 to run at a clock rate (i.e., clock frequency) of 1/N, and to generate N phase components in parallel.

At each clock cycle of the Input NCO Clock signal, all N phases are available at the output terminals of NCO 101. Extract most significant bits (MSBs) circuit 102 extracts the most significant bit (MSB) from each of the N output phases of NCO 101 in each clock cycle of the Input NCO Clock signal. Thus, circuit 102 extracts one MSB from each parallel bus 107. The Extract MSB circuit 102 generates an N number of MSBs in parallel at its N output terminals.

Extract MSBs circuit 102 can, for example, include an N number of M-to-1 multiplexers. Each of the multiplexers selects the most significant bit from one of parallel buses 107. The multiplexers transmit the selected most significant bits from each parallel bus 107 to the output terminals of Extract MSBs circuit 102.

The digital value of each MSB extracted by circuit 102 is either 0 or 1, depending upon whether the binary value of the corresponding phase shift signals on bus 107 is positive or negative using a two's complement system. The MSBs extracted by circuit 102 are transmitted in parallel through N signal lines to high-speed N:1 serializer 103. Serializer 103 is a parallel-to-serial converter. Serializer 103 converts the N parallel MSBs from circuit 102 into a serially transmitted output bit stream of MSBs. Serializer 103 can be, for example, a shift register that is clocked at a high-speed.

Figure 2:
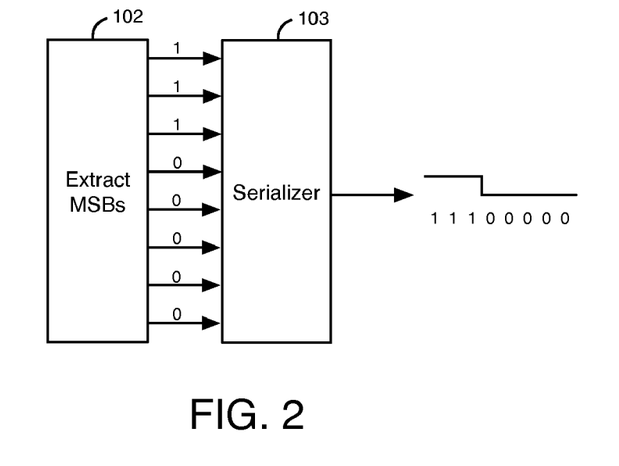
FIG. 2 illustrates an example of how the digital values of the most significant bits form edges in a clock signal, according to an embodiment of the present invention.

The transitions between the 0's and the 1's in the serial output bit stream of MSBs generated by serializer 103 are the rising and the falling edges of a synthesized clock signal. FIG. 2 illustrates an example of how the digital values of the most significant bits (MSBs) in the serial bit stream form edges in a clock signal, according to an embodiment of the present invention. In the example of FIG. 2, Extract MSB circuit 102 extracts MSBs of 11100000 in parallel from buses 107. Serializer 103 converts the parallel MSBs into a serial stream of bits 11100000. The serial stream of bits is a clock signal having falling edges at each 1 to 0 transition (as shown in FIG. 2) and rising edges at each 0 to 1 transition. Each 1 corresponds to a logic high state in the clock signal, and each 0 corresponds to a logic low state in the clock signal.

The serial output bit stream of serializer 103 is transmitted to an input of a dedicated high-speed low voltage differential signaling (LVDS) output buffer 104. Output buffer 104 drives the serial bit stream of most significant bits (MSBs) as differential signals through output pins to external routing transmission lines outside integrated circuit 100. The differential MSB signals are transmitted through the external routing transmission lines back to clock input pins in a different portion of integrated circuit 100. The clock input pins of integrated circuit 100 are coupled to the differential input terminals of flexible LVDS input buffer 105. Input buffer 105 generates a single-ended synthesized clock signal in response to the differential MSB signals received from output buffer 104.

The clock synthesizer of FIG. 1 can generate a clock signal that has a frequency greater than one-fourth the frequency of the Input NCO Clock signal. The FIG. 1 clock synthesizer can generate a clock signal at the output terminal of serializer 103 having a maximum frequency that is based on the equivalent NCO clock signal frequency. The equivalent NCO clock signal frequency is the frequency of the Input NCO Clock signal times N, where N is the number of output phases of a sinusoidal waveform that are generated by NCO 101.

For example, if the Input NCO Clock signal has a frequency F of 100 megahertz (MHz), and NCO 101 generates N=8 output phases of a sinusoidal waveform, the equivalent NCO clock signal frequency is 800 MHz (i.e., F×N). If the Input NCO Clock signal frequency is 100 MHz, and N=8, the clock synthesizer of FIG. 1 can generate a synthesized clock signal at the output of serializer 103 having a frequency of up to 200 MHz, i.e., one-fourth the frequency of 800 MHz. These example frequencies are provided for illustration and are not intended to limit the scope of the present invention. The clock synthesis circuit of FIG. 1 can generate a synthesized clock signal at the output of serializer 103 that has a frequency equal to (F×N)/4. A prior art NCO can only generate a clock signal having a maximum frequency of 25 MHz in response to an input clock signal having a frequency of 100 MHz.

The amount of jitter in a clock signal generated by an NCO is dependent on the frequency of the clock signal generated by the NCO. More particularly, jitter is inversely proportional to the clock frequency generated by the NCO. For a single phase NCO with an input frequency F of 100 MHz, the equivalent jitter is 1/100 MHz or 10 nanoseconds. For the multi-phase NCO approach shown in FIG. 1, the jitter is significantly reduced. If the Input NCO Clock signal has a frequency F of 100 MHz, N=8, and the equivalent NCO clock frequency is 800 MHz, the associated jitter in the synthesized clock signal at the output terminal of serializer 103 is $1/(800 \times 10^6)$ or 125 picoseconds (i.e., 1/(F×N)), which is significantly less than 10 nanoseconds.

The minimum jitter of the synthesized clock signal is related to the maximum high-speed serial frequency that can be generated by the LVDS buffers 104 and 105. The minimum jitter of the synthesized clock signal at the output of buffer 105 is 1/(LVDS frequency). For example, the LVDS frequency is 1.25 GHz for the Stratix® series of devices manufactured by Altera Corporation, which corresponds to a jitter of 80 picoseconds. As another example, the LVDS frequency is 840 MHz for the Cyclone® series of devices manufactured by Altera Corporation, which corresponds to a jitter of 119 picoseconds. Other devices may reduce jitter further by increasing the LVDS serial frequencies.

The frequency of the synthesized clock signal generated at the output terminal of serializer 103 varies in response to changes in a numerical value represented by the frequency of the Phase Increment signal. As a result, arbitrary clock synthesis is possible for frequencies that are not allowed by phase-locked loops (PLLs). A PLL synthesizes the frequencies of its output signals to the frequency of an input reference clock signal based upon a number of fixed X/Y fractional relationships. The X and Y limits are designed into the silicon. On the other hand, the clock synthesizer of FIG. 1 can generate a synthesized clock signal at the output terminal of serializer 103 that has arbitrary X/Y fractional relationships. A PLL can generate, for example, a 100 MHz clock signal from an input clock signal of 50 MHz, but the same PLL would not be able to synthesize 99 MHz, 99.5 MHz, 100 MHz, or 100.5 MHz. The clock synthesizer of FIG. 1 can provide sub-Hertz resolution thereby realizing these frequencies. Frequency tuning is done by changing a numeric value represented by the frequency of the Phase Increment signal.

In addition, the clock synthesizer of FIG. 1 can generate higher resolution clock signals than are possible with a prior art NCO. Prior art NCOs are limited to generating a maximum frequency of F/4. The clock synthesizer of FIG. 1 can synthesize frequencies up to F*N/4. Assuming a 100 MHz Input NCO Clock signal and N=8, the clock synthesizer of FIG. 1 can synthesize frequencies up to 100 MHz*8/4 or 200 MHz.

Figure 3:
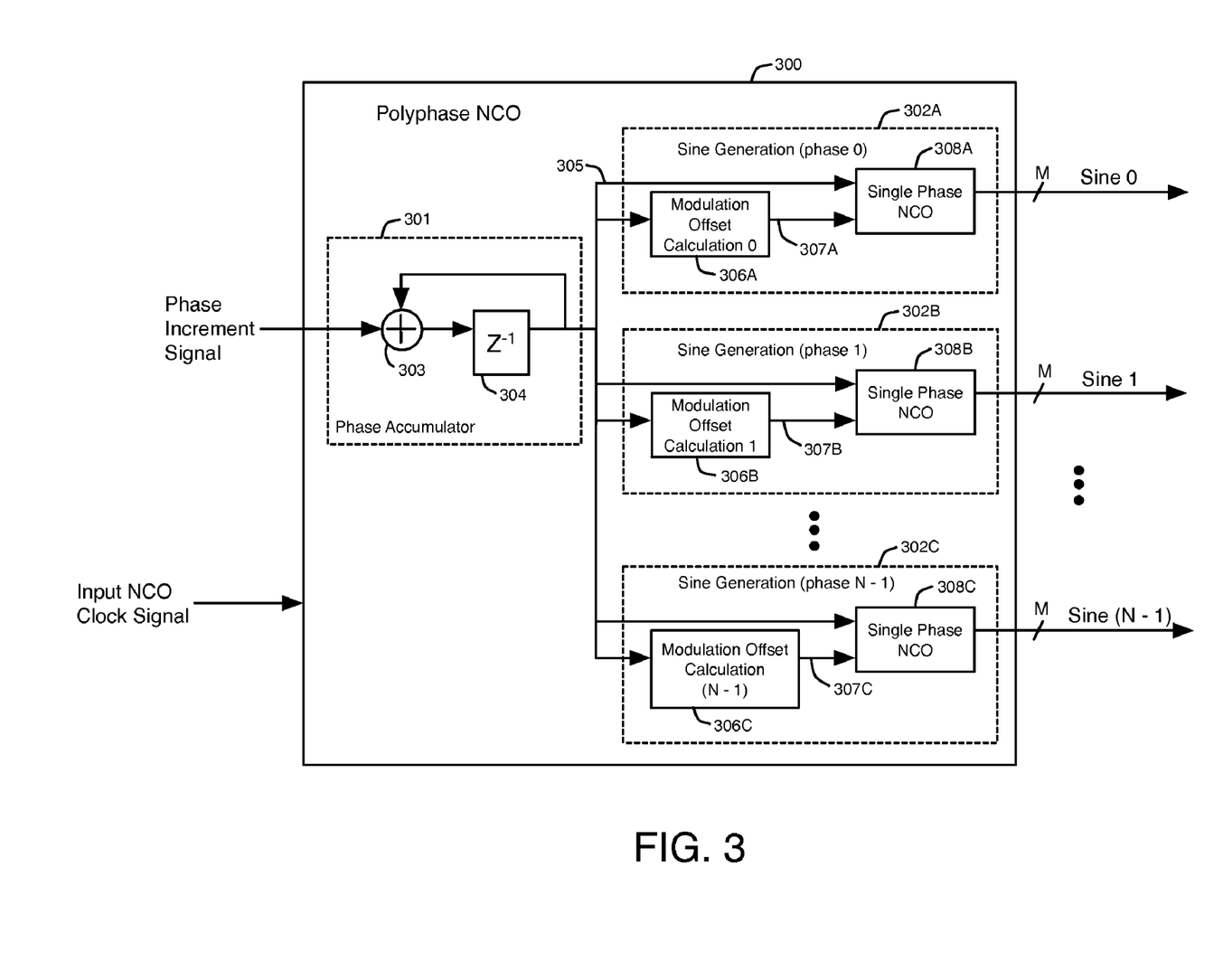
FIG. 3 illustrates an example of a polyphase numerically controlled oscillator that can be used in the clock synthesis circuit of FIG. 1, according to an embodiment of the present invention.

FIG. 3 illustrates an example of a polyphase numerically controlled oscillator that can be used in the clock synthesis circuit of FIG. 1, according to an embodiment of the present invention. Polyphase numerically controlled oscillator (NCO) 300 shown in FIG. 3 is an example of polyphase NCO 101 in FIG. 1. Polyphase NCO 300 includes a phase accumulator 301 and an N number of sine generation circuits 302, including sine generation circuits 302A, 302B, and 302C. Phase accumulator 301 includes adder 303 and $Z^{-1}$ delay circuit 304.

The Phase Increment signal is a digital signal that is transmitted to a first input terminal of adder 303. The second input terminal of adder 303 is coupled to the output terminal of delay circuit 304. In each cycle of the Input NCO Clock signal, adder 303 adds the Phase Increment signal to the delayed output signal of delay circuit 304. The result of the addition is the output signal of adder 303. The output signal of adder 303 is delayed by delay circuit 304 and then transmitted to the second input terminal of adder 303 to be added to the Phase Increment signal in the next cycle. The delayed output signal of delay circuit 304 is also transmitted to the input terminals of sine generation circuits 302 as signal 305, as shown in FIG. 3.

Each of the sine generation circuits 302 has a modulation offset calculation circuit 306 and a single-phase numerically controlled oscillator (NCO) 308. The modulation offset calculation performed by each of circuits 306 is used to provide the phase offset signal 307 for a particular NCO 308. The modulation offset calculations performed by the modulation offset calculation circuits 306 are shown in equations (1)-(4) below. In equations (1)-(4), $F_{NCO}$ is the frequency of the high-speed Input NCO Clock signal, N is the number of NCO parallel blocks (i.e., phases), $F_{CLK}=F_{NCO}/N$ is the actual maximum frequency used to clock the NCO, $F_{OUT}$ is the desired carrier frequency, X is the accumulator precision, and Y is the angular precision.

$$\text{phase\_mod}(NCO_0^k) = Q_0^k \tag{1}$$

$$\text{phase\_mod}(NCO_0^k) = Q_0^k \tag{1}$$

$$\text{phase\_mod}(NCO_1^k) = Q_1^k \times 2^Y \times \frac{F_{OUT}}{F_{NCO}} \tag{2}$$

$$\text{phase\_mod}(NCO_2^k) = Q_2^k \times 2^Y \times \frac{F_{OUT}}{F_{NCO}} \tag{3}$$

$$\ldots$$

$$\text{phase\_mod}(NCO_{N-1}^k) = Q_{N-1}^k \times 2^Y \times \frac{F_{OUT}}{F_{NCO}} \tag{4}$$

In equations (1)-(4), phase_mod refers to modulation offset calculations performed by circuits 306 to generate signals 307. For example, equation (1) is performed by circuit 306A to generate signal 307A, and equation (2) is performed by circuit 306B to generate signal 307B. In equations (1)-(4), $Q_L^k$ is an integer sequence with k elements, where L refers to the NTH NCO block, L={0, 1, 2, . . . , N−1}, and k={0, 1, 2, ..., P−1}. In equations (1)-(4), $Q_L^0 = L$, and $Q_L^k = [Q_L^{k-1} + (N-1)] \mod P$, where $P = F_{OUT}/F_{NCO}$, and mod refers to the modulo operation.

The value of the output signal 305 of phase accumulator block 301 is a successive accumulation of the Phase Increment Signal, which determines the frequency of the sine wave to be generated. The Phase Increment Signal is calculated by equation (5) shown below.

$$\text{Phase\_Increment\_Signal} = 2^X \times \frac{F_{OUT}}{F_{NCO}} \quad (5)$$

Several different algorithms can be used for the single phase NCO 308. These include, but are not limited to, table look up, CORDIC (Coordinate Rotation Digital Computer) rotation, and trigonometric series expansion. Each NCO 308 defines values that specify discrete temporal points of a normalized sinusoidal waveform. The discrete temporal points represent a normalized sinusoidal waveform when read in a sequential closed-loop manner. Outputting values corresponding to the discrete temporal points in the sequential closed-loop manner generates corresponding digital signals. Upon receiving input signal 305 from phase accumulator 301, each sine generation circuit 302 outputs M digital signals on a parallel bus. Each of the M digital signals on the parallel bus represents a subsequent discrete temporal point of the normalized sinusoidal waveform. Each digital output signal generated by sine generation circuits 302 generates a corresponding phase of an equivalent high speed NCO.

Upon receipt of the Phase Increment signal, phase accumulator 301 functions to send signal 305 to the sine generation circuits 302. The discrete temporal points included within the values of sine generation circuits 302 are outputted in response to the Phase Increment signal. Each sine generation circuit 302 generates M digital output signals that correspond to a sine wave having a phase that is offset by 1/N times the period of the sine wave relative to the phases generated by two of the other sine generation circuits 302.

If the Phase Increment signal is defined as a clock signal, the discrete temporal points are selected from the sine generation circuits 302 at a frequency that is derived from the frequency of the Phase Increment signal. The frequency of the digital output signals of the sine generation circuits 302 is derived from the frequency of the Input NCO Clock and Phase Increment signals. The frequency of the digital output signals of the sine generation circuits 302 is $f_{output} = (\text{phase\_increment} * f_{equiv\_clk})/2^{accumulator\_precision}$, where $f_{equiv\_clk}$ is the equivalent clock frequency, the accumulator precision is the width of accumulator 301, and phase_increment is the frequency of the Phase Increment signal. The equivalent clock frequency for the clock synthesizer of FIG. 1 is the frequency of the Input NCO Clock signal times N.

In the example of FIG. 3, sine generation circuit 302A generates M digital output signals (Sine 0) that correspond to a sine waveform having a 0° phase shift as determined by modulation offset calculation circuitry 306A. Sine generation circuit 302B generates M digital output signals (Sine 1) that correspond to a sine wave having a single phase shift offset period as determined by modulation offset calculation circuitry 306B. Sine wave generation circuit 302C generates M digital output signals (Sine (N−1)) that correspond to a sine wave having a (N−1)/N phase shift offset period as determined by modulation offset calculation circuitry 306C.

Figure 4:
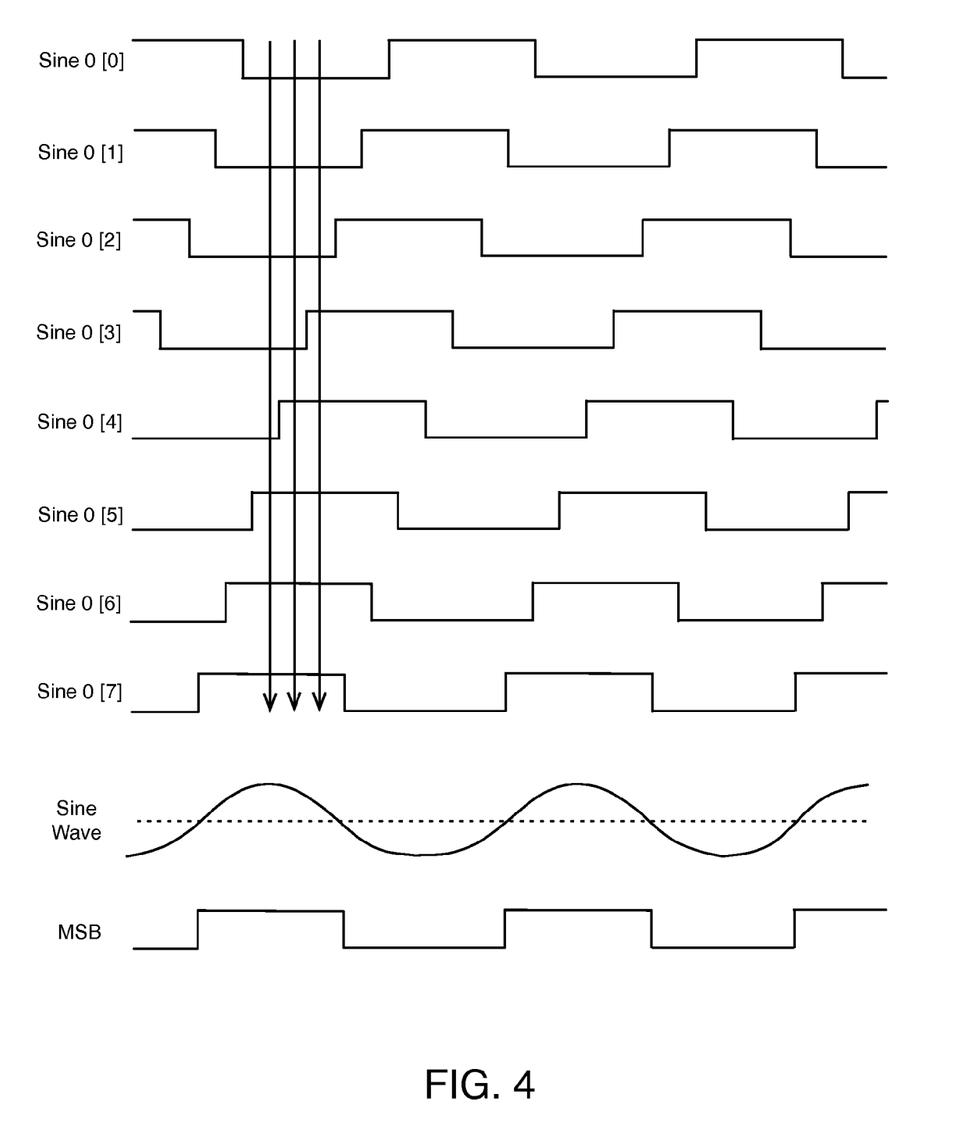
FIG. 4 is a graph that illustrates examples of various waveforms, according to an embodiment of the present invention.

FIG. 4 illustrates examples of 8 digital MSB signals Sine 0 [0:7] that can be generated by sine generation circuit 302A, according to an embodiment of the present invention. Sine 0 [N] represents the most significant bit of the N phase generated by NCO 101. These particular 8 digital signals Sine 0 [0:7] correspond to the N extracted MSBs from the Extract MSB block 102 and illustrate the phase offset between adjacent NCO phases. FIG. 4 also illustrates a Sine Wave. The Sine Wave is representative of one of the outputs from NCO 101 before the MSB has been extracted by Extract MSBs circuit 102.

The output frequency of the clock synthesizer is determined by Serializer 103, which takes vertical slices of Sine 0 [0:7], as shown, for example, by the vertical lines in FIG. 4. In this case, Serializer 103 runs 8 times faster. These vertical slices produce the patterns of ones and zeros that eventually make up the clock edges of the synthesized clock signal.

Figure 5:
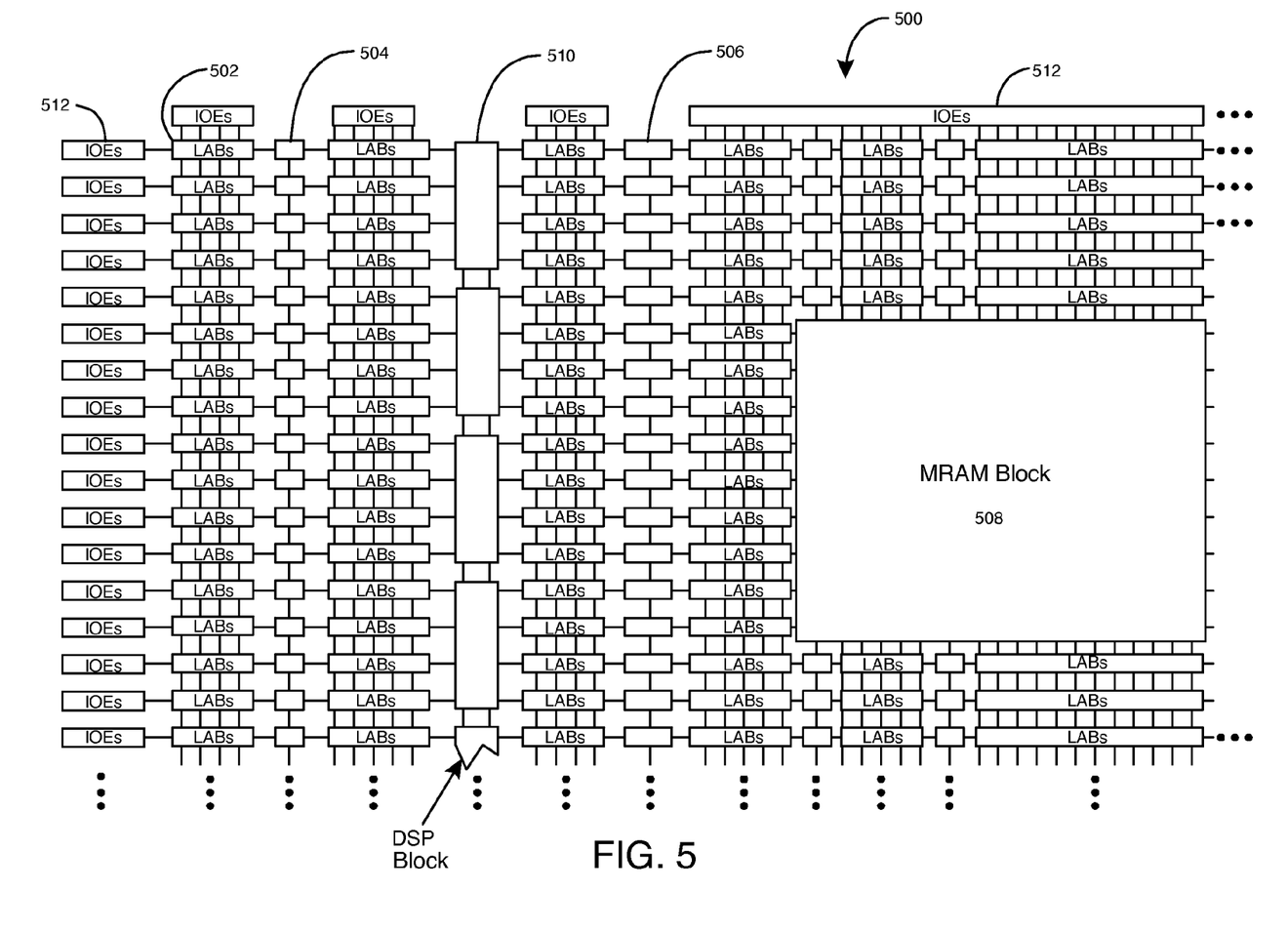
FIG. 5 is a simplified partial block diagram of a field programmable gate array (FPGA) that can include aspects of the present invention.

FIG. 5 is a simplified partial block diagram of a field programmable gate array (FPGA) 500 that can include aspects of the present invention. FPGA 500 is merely one example of an integrated circuit that can include features of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), and application specific integrated circuits (ASICs).

FPGA 500 includes a two-dimensional array of programmable logic array blocks (or LABs) 502 that are interconnected by a network of column and row interconnect conductors of varying length and speed. LABs 502 include multiple (e.g., 10) logic elements (or LEs).

An LE is a programmable logic circuit block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 500 also includes a distributed memory structure including random access memory (RAM) blocks of varying sizes provided throughout the array. The RAM blocks include, for example, blocks 504, blocks 506, and block 508. These memory blocks can also include shift registers and FIFO buffers.

FPGA 500 further includes digital signal processing (DSP) blocks 510 that can implement, for example, multipliers with add or subtract features. Input/output elements (IOEs) 512 located, in this example, around the periphery of the chip, support numerous single-ended and differential input/output standards. IOEs 512 are coupled to input/output pins. Each of the input/output pins is an external terminal of the FPGA. It is to be understood that FPGA 500 is described herein for illustrative purposes only and that the present invention can be implemented in many different types of PLDs, FPGAs, and ASICs.

Figure 6:
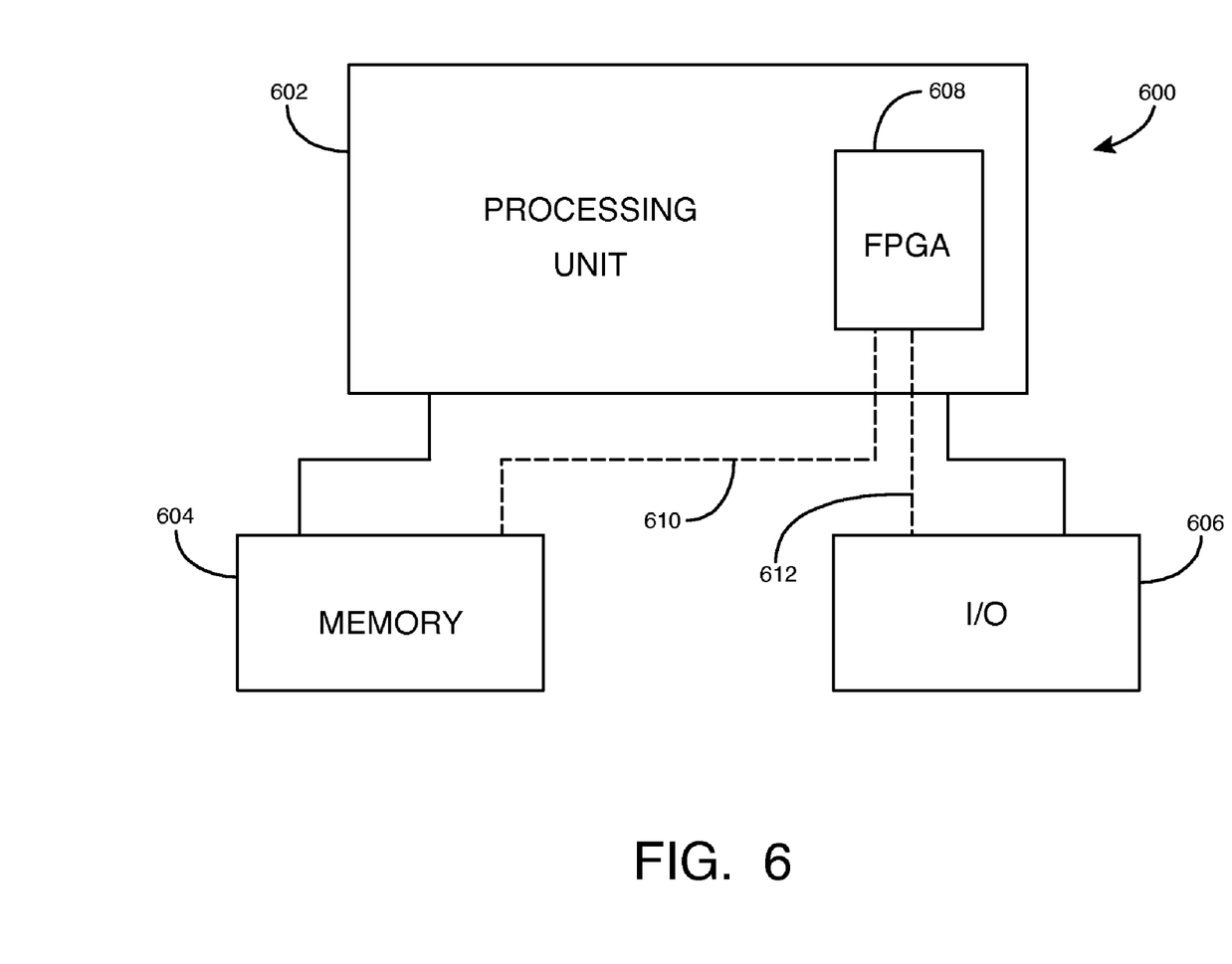
FIG. 6 shows a block diagram of an exemplary digital system that can embody techniques of the present invention.

The present invention can also be implemented in a system that has an FPGA as one of several components. FIG. 6 shows a block diagram of an exemplary digital system 600 that can embody techniques of the present invention. System 600 can be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 600 can be provided on a single board, on multiple boards, or within multiple enclosures.

System 600 includes a processing unit 602, a memory unit 604, and an input/output (I/O) unit 606 interconnected together by one or more buses. According to this exemplary embodiment, an FPGA 608 is embedded in processing unit 602. FPGA 608 can serve many different purposes within the system of FIG. 6. FPGA 608 can, for example, be a logical building block of processing unit 602, supporting its internal and external operations. FPGA 608 is programmed to implement the logical functions necessary to carry on its particular role in system operation. FPGA 608 can be specially coupled to memory 604 through connection 610 and to I/O unit 606 through connection 612.

Processing unit 602 can direct data to an appropriate system component for processing or storage, execute a program stored in memory 604, receive and transmit data via I/O unit 606, or other similar functions. Processing unit 602 can be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 608 can control the logical operations of the system. As another example, FPGA 608 acts as a reconfigurable processor, which can be reprogrammed as needed to handle a particular computing task. Alternatively, FPGA 608 can itself include an embedded microprocessor. Memory unit 604 can be a random access memory (RAM), read only memory (ROM), fixed or flexible disk media, flash memory, tape, or any other storage means, or any combination of these storage means.

The foregoing description of the exemplary embodiments of the present invention has been presented for the purposes of illustration and description. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. A circuit comprising:
    a polyphase numerically controlled oscillator that generates sets of periodic output signals, wherein each set of the periodic output signals represents a different phase of a periodic waveform signal;
    an extraction circuit that extracts a most significant bit from each set of the periodic output signals of the polyphase numerically controlled oscillator to generate most significant bits; and
    a clock signal generation circuit that converts the most significant bits into a bit stream to generate an output clock signal.

2. The circuit defined in claim 1 wherein the polyphase numerically controlled oscillator generates N sets of periodic output signals representing N phases of a periodic sinusoidal waveform signal in response to an input clock signal having a frequency F, and the polyphase numerically controlled oscillator causes the output clock signal to have a frequency that equals one-fourth of F×N.

3. The circuit defined in claim 1 wherein the polyphase numerically controlled oscillator receives a phase increment signal and an input clock signal, the polyphase numerically controlled oscillator selects the frequency of the output clock signal based on the frequency of the input clock signal, and the polyphase numerically controlled oscillator shifts the frequency of the output clock signal in response to a change in the numerical value of the phase increment signal.

4. The circuit defined in claim 1 wherein the polyphase numerically controlled oscillator generates N sets of periodic output signals representing N phases of the periodic waveform signal in response to an input clock signal having a frequency F, and the polyphase numerically controlled oscillator causes the output clock signal to have a jitter equal to 1/(F×N).

5. The circuit defined in claim 1 wherein the polyphase numerically controlled oscillator generates N sets of periodic output signals representing N phases of the periodic waveform signal on N parallel buses, and each set of the periodic output signals representing one of the N phases is transmitted through one of the N parallel buses to the extraction circuit.

6. The circuit defined in claim 5 wherein the polyphase numerically controlled oscillator generates N sets of M periodic output signals representing N phases of the periodic waveform signal on the N parallel buses, and each of the M periodic output signals on each parallel bus is offset in phase from adjacent periodic output signals on that parallel bus by 1/M times a period of the M periodic output signals.

7. The circuit defined in claim 1 wherein the clock signal generation circuit is a serializer that converts the most significant bits into a serial bit stream.

8. The circuit defined in claim 1 further comprising:
    an output buffer coupled to receive the output clock signal from the clock signal generation circuit and to drive the output clock signal to output pins of an integrated circuit, wherein the clock signal generation circuit is a serializer that converts the most significant bits into a serial bit stream.

9. The circuit defined in claim 1 wherein the polyphase numerically controlled oscillator, the extraction circuit, and the clock signal generation circuit are fabricated on a programmable logic integrated circuit.

10. The circuit defined in claim 1 wherein the polyphase numerically controlled oscillator comprises sine generation circuits, and each of the sine generation circuits comprises a modulation offset calculation circuit that generates a phase offset signal and a single phase numerically controlled oscillator that generates a set of the periodic output signals in response to the phase offset signal and a phase increment signal.

11. A system comprising:
    a polyphase numerically controlled oscillator generating sets of periodic output signals in parallel in response to an input clock signal, wherein each of the sets of periodic output signals represents a different phase of a periodic sinusoidal signal;
    an extraction circuit that extracts a most significant bit from each of the sets of periodic output signals of the polyphase numerically controlled oscillator and outputs the most significant bits in parallel; and
    a serializer that performs a parallel-to-serial conversion on the most significant bits output by the extraction circuit to generate a serial bit stream, wherein the serial bit stream forms an output clock signal.

12. The system defined in claim 11 wherein the polyphase numerically controlled oscillator generates N sets of periodic output signals representing N phases of the periodic sinusoidal signal in response to the input clock signal that has a frequency F, and the polyphase numerically controlled oscillator causes the output clock signal to have a frequency that equals one-fourth of F×N.

13. The system defined in claim 12 wherein the polyphase numerically controlled oscillator receives a phase increment signal, and the polyphase numerically controlled oscillator shifts the frequency of the output clock signal in response to a change in the numerical value of the phase increment signal.

14. The system defined in claim 11 wherein the polyphase numerically controlled oscillator comprises sine generation circuits, and each of the sine generation circuits comprises a modulation offset calculation circuit that generates a phase offset signal and a single phase numerically controlled oscillator that generates one of the sets of periodic output signals in response to the phase offset signal and a phase increment signal.

15. The system defined in claim 11 wherein the polyphase numerically controlled oscillator generates N sets of periodic output signals representing N phases of the periodic sinusoidal signal on N parallel buses, and each set of the periodic output signals representing one of the N phases is transmitted through one of the N parallel buses to the extraction circuit.

16. The system defined in claim 11 further comprising:
   a LVDS output buffer on an integrated circuit coupled to receive the serial bit stream from the serializer and to drive the output clock signal to output pins; and
   a LVDS input buffer on the integrated circuit coupled to receive the output clock signal from external routing transmission lines at input clock pins.

17. A method for generating a clock signal, the method comprising:
   generating sets of periodic output signals using a polyphase numerically controlled oscillator, wherein each set of the periodic output signals represents a different phase of a periodic waveform signal;
   extracting a most significant bit from each set of the periodic output signals of the polyphase numerically controlled oscillator to generate most significant bits; and
   converting the most significant bits into a serial bit stream that forms an output clock signal.

18. The method defined in claim 17 wherein generating the sets of periodic output signals using the polyphase numerically controlled oscillator further comprises generating N sets of periodic output signals representing N phases of a periodic sinusoidal signal in response to an input clock signal having a frequency F, and causing the output clock signal to have a frequency that equals (F×N)/4.

19. The method defined in claim 17 wherein generating the sets of periodic output signals using the polyphase numerically controlled oscillator further comprises selecting the frequency of the output clock signal based on the frequency of an input clock signal received at the polyphase numerically controlled oscillator, and shifting the frequency of the output clock signal in response to a change in the numerical value of a phase increment signal received at the polyphase numerically controlled oscillator.

20. The method defined in claim 18 wherein the polyphase numerically controlled oscillator causes the output clock signal to have a jitter equal to 1/(F×N).

* * * * *